Patented Dec. 2, 1930

1,783,626

UNITED STATES PATENT OFFICE

WILLIAM B. NEWKIRK, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE

METHOD OF MAKING CRYSTALLINE DEXTROSE

No Drawing. Original application filed January 17, 1925, Serial No. 3,105. Divided and this application filed June 9, 1926. Serial No. 114,863.

My invention relates to the manufacture of a high purity crystalline dextrose derived from starch or starch bearing materials.

In Patent No. 1,471,347, granted to me October 23, 1923, methods of manufacture both of the hydrate and of the anhydrous dextrose were described. The solution of the problem in the manufacture of this product in a granular state and having a high purity and white color involves the production in the crystallizer of a magma of dextrose crystals and mother liquor of such character that the mother liquor can be completely purged from the mass of crystals, for example, in a centrifugal machine. In accordance with the method described in this patent, a purgeable magma can be obtained with converted liquors of ordinary purity (89 to 90% dextrose), by carrying out the crystallizing operation with the magma in gentle movement and by maintaining conditions of density and temperature such as to be favorable in a very definite way to the production either of the anhydride or the hydrate. As these conditions are sometimes difficult to maintain in ordinary factory practice an improvement of a very practical value was made and was disclosed in Patent No. 1,521,830, granted to me on January 6, 1925, for manufacture of dextrose. In accordance with this improvement the quantity of the solid phase dextrose, either in the solution initially as seed or developed by crystallization, or both, is utilized to control the induction of new crystals so that less care and attention has to be paid to the maintenance of other conditions during the crystallizing operation than was necessary with the method described in Patent No. 1,471,347. The danger to be guarded against is, apparently, a too rapid crystallization, which tends to become uncontrollable, thereby causing formation of minute and deformed crystals, instead of the normal anhydrous or hydrate crystals, as the case may be. This too rapid crystallization may occur because under certain circumstances the natural velocity of crystallization may be high, or it may result from too high a degree of supersaturation, or from both causes combined. The presence of impurities in the solution tends, according to the amount and also to the character of the impurities, to retard initial crystallization, so that before crystallization starts excessive supersaturation will occur followed, as soon as the crystallization begins, by a very sudden formation of crystals, so rapid in fact as to be very likely to produce an unpurgeable magma of false grain instead of the body of purgeable normal crystals desired. A common starch converted dextrose solution of 89% purity, and without the presence of solid phase, may reach a supersaturation equivalent to approximately 30% dextrose, that is, approximately 30% more dextrose than the liquor will contain at saturation, before the crystallization is initiated. The presence in the solution of the relatively large quantity of solid phase dextrose of the proper crystal type and properly distributed through the solution, serves to so control crystallization even under conditions of high supersaturation, that a purgeable magma of normal crystals may be produced without excessive care as to temperatures, densities, kind and quantity of impurities.

On further investigation and experimentation, I have found that equivalent results can be obtained, to a certain extent at least, by other means than the use of large quantities of the solid phase dextrose. The difficulty of control being due to excessive supersaturation, it was found that a purgeable magma could be obtained if normal crystallization could be initiated at a lower degree of supersaturation than is usual. This I have discovered to be possible under properly regulated conditions, as will be hereinafter described. The following are illustrative examples of the manner in which the principles of my invention may be put into practice.

(a) If a relatively impure dextrose, such as the "third sugar" of Patent 1,471,347, which, as stated in the patent, may contain too high a percentage of impurities (4% or 5%, for example), to make its marketing desirable, is completely melted with the addition of water to the desired gravity, 40° Baumé, or thereabouts, (calculated at 100° F. as is customary in this industry) and then crystallized in motion, as described in that patent, within what has been usually termed the anhydrous temperature range—120° Fahrenheit or above (the crystallizing temperature range being raised or lowered as the density of the liquor is greater or less than that indicated), supersaturation of the solution will induce the formation of anhydrous crystals of a purgeable character, spontaneously, without the addition of any seed crystals at all. Under these conditions, crystalliztion will be initiated as soon, approximately, as supersaturation occurs. Of course, the use of seed crystals, if of the proper anhydrous type, will not be any detriment but under certain conditions will be an aid. As the solid phase in the magma increases the temperature may be lowered, since with the larger quantity of solid phase present and eqally distributed in the solution the degree of supersaturation can be increased without bringing about the formation of false grain. The advantage of the temperature reduction is that with the resulting increase in the degree of supersaturation crystallization takes place more rapidly, giving a larger yield for a given period of time. One can, in fact, produce the anhydride with lower initial temperatures than those mentioned, provided the solution is liberally seeded with anhydrous crystals at the start, but this is at the sacrifice of one of the advantages of this phase of my invention which is to avoid the employment of seed or at least large quantities of seed. The crystallizing magma is kept in movement, preferably, so that the solid phase dextrose as formed, is uniformly distributed, with the result that the crystals develop singly, and not in groups or clusters. By single crystals I do not means to exclude multiple forms or closely unified aggregates of grown together crystals. The term "single granules" would probably be preferable. Where groups or clusters of needle-like or flake-like crystals are formed, the mass cannot be purged or at least completely purged because these clusters and their component needles and flakes break down and filling the voids in the mass gives it such density that the mother liquor cannot be expelled.

When crystallization is complete the magma is centrifuged as described in Patent No. 1,471,347 and with proper washing will yield a sugar which is very close to absolute purity.

In the preferred practice of the process just described an important advantage is obtained in that the entire batch is net yield. None goes for seed for the next batch. It may be stated that it makes no difference whether the sugar melted is hydrate or an anhydride, or a mixture of both. Therefore the method may be used for treatment of a sugar batch at any stage of the manufacture, where the condition of the batch is such that it cannot be purged, of its mother liquor.

(b) A similar result is obtained by using converted liquors of greater purity, 93% or higher, for example, than the converted liquors heretofore employed. The density of the liquor may be 40° Baumé as stated in (a) above. By greater purities, however, I refer not only to the quantity of the non-dextrose substances, but also to their character. Apparently there are certain impurities likely to be found in starch converted liquors which tend particularly to hold back initial crystallization, producing a higher degree of supersaturation before the formation of new crystals starts. By decreasing the proportion of impurities or preventing the formation of these specifically objectionable substances crystallization will take place without a high degree of supersaturation, so that a large quantity of solid phase dextrose is not required in order to obtain a purgeable magma.

In the conversion of starch for the manufacture of high purity dextrose it has been usual with a batch, for example, of 4500 pounds of starch in suspension in water at a density of $12\frac{1}{2}°$ Baume, acidified with 90 pounds of hydrochloric acid and converted under 45 pounds of steam pressure, to treat the material in the converter for a period of from 24 to 28 minutes. There is formed in this conversion certain reversion and condensation products (condensed dextrose caramels, and the like). These condensation and reversion products, or whatever they may be, seem to make it necessary, if they are present in sufficient amounts, that the solution should be brought to a higher degree of supersaturation before crystallization takes place than would otherwise be necessary, with the resulting danger of sudden and rapid, and therefore, difficultly controllable crystallization, necessitating, if this tendency is to be effectively checked, the use, initially, of relatively large quantities of the solid phase in the solution. There impurities also tend to suppress the alpha anhydrous phase, thereby tending to force, partially, a hydrate crystallization.

The conversion may, however, be of a gentler nature than above indicated, whereby the formation of these reversion and condensation products, in undesirable quantities at least, is avoided. For example: The starch may be converted in an open converter instead of under steam pressure. The purer liquor thus obtained will crystallize at lower degrees of supersaturation and with less difficulty as to control than the usual starch converted dextrose solution. The conversion process, however, is long and expensive. It is also possible to obtain a higher purity converted liquor by using a starch suspension of a lower density than the customary 12° Baumé starch liquor, even though the conversion is under pressure. For example, if conversion is made with a starch suspension of 6° Baumé, a converted liquor is obtained which can be controlled during crystallization without the use of as large amount of seed as is required with the converted liquor made from a higher density starch suspension. Another method of obtaining the desired result is to carry on the conversion under ordinary steam pressure but for a shorter time than usual, for example, 21 or 22 minutes. This treatment will give a solution having almost the maximum dextrose content obtainable. The resultant liquor will not have the objectionable impurities, at least in such large quantities, and as a result crystallization is initiated at a lower degree of supersaturation. Similar results can be obtained by mixing a re-melted dextrose of relatively high purity with converted liquors of ordinary purity.

With the converted liquors produced by method (b) it is possible to make either the anhydride or the hydrate, depending upon whether crystallization is induced under conditions definitely favoring the formation of the solid phase of one type or the other; that is, depending upon whether the operation takes place in the anhydrous as defined above under (a) range or the hydrate range of temperature, and also whether the solution be relatively pure or impure, dextrose tending to crystallize out as the anhydride from solutions having a relatively small impurity content and as the hydrate from solutions containing a relatively large amount of impurities. For a high purity product in any of these cases the crystallizing magma should be kept in motion, so that the solid phase will be maintained in relatively equal dispersion throughout the liquid.

The desired result is obtained, apparently, in the case of method (a) for the following reasons:

There are two kinds of dextrose known as alpha and beta. The alpha dextrose has a specific rotation of 110° approximately, to the right. The beta has a specific rotation, in the same direction, of 19°. A mixture of the two at equilibrium will have a specific rotation of approximately 52.5° to the right. The understanding is that a dextrose solution, whether initially alpha or beta or unbalanced mixtures of the two, tends to change, in part, from alpha to beta or beta to alpha, as the case may be, until an equilibrium is reached. This equilibrium is the equilibrium between the anhydrous and the hydrate phases of the alpha and beta dextrose. The alpha anyhydrous dextrose tends to crystallize in crystals of normal form, if the solution is kept in movement, under the following conditions: (1) unbalanced equilibrium in the alpha anhydrous direction; (2) from equilibrium provided the solution is relatively free from impurities and the temperature is not too low. The monohydrate alpha dextrose tends to crystallize as normal hydrate crystals, with the solution in movement, under the follow conditions: (1) unbalanced equilibrium in the alpha monohydrate direction; (2) relatively low temperatures; (3) the presence of impurities. A mixture of alpha and beta dextrose in an alcohol solution (the term "solution" without qualification intending herein a water solution) will crystallize as Tanret's mixture (alpha and beta) under the following conditions: (1) relatively stable equilibrium as between alpha and beta; (2) extremely low temperatures (about 32° Fahrenheit or lower); (3) high purity of the solution.

Anhydrous beta dextrose crystallizes under the following conditions: (1) highly unbalanced condition in the direction of beta anhydrous dextrose; (2) temperatures approximately 208° Fahrenheit or higher; (3) high purity of the solution. So far as I know the equilibrium mixture (Tanret's) and the beta dextrose do not crystallize as a hydrate.

The alpha anhydrous and hydrate (the dextroses of commerce) can be made to crystallize out of solution even when the conditions as above noted in respect to each of these types are unfavorable, provided there be a large quantity of appropriate solid phase present.

Thus when a relatively impure sugar (but having a higher purity than the ordinary converted liquor) is completely melted and equilibrium is established between the alpha and the beta dextrose, that is between the anhydrous and the hydrate phases of the alpha and beta dextrose, and as the suppressing influences of the impurities on the alpha anhydrous dextrose are low the anhydrous dextrose crystallizes out more readily than the hydrate. The resultant crystals will be properly formed, normal anhydrous crystals. As the anhydrous sugar comes out of the solution, the balance will be changed in the solution in the direction of the alpha anhydrous dextrose. Thus the crystallization is regular and normal and will take place without excessive supersaturation.

The results desired are obtained in the case of method (b), apparently, because, as stated, the impurities in the solution, or at least certain of these impurities, which operate to prevent the dextrose in solution from initial crystallization, are absent or of insignificant quantity. This means that when the solution is cooled or reduced in moisture content, the induction of new crystals takes place without a high initial supersaturation and can therefore be controlled with less solid phase of the crystal type desired than needs to be used under present manufacturing conditions, without running the risk of the formation of flake-like or needle-like crystals, which give the magma such character that it cannot be purged or at least completely purged.

By "normal" crystals I mean crystals of substantial cross sectional areas in respect to all axes so that the magma has a hard, granular or sandy consistency in distinction to a magma containing "false grain", to wit, the very minute or needle-like or flake-like crystals which, if they are present, at least in relatively large quantities, give the magma a soft or soapy consistency. The test is that a magma of the first mentioned sort is completely or substantially completely purgeable by centrifuging, while one of the other sort is not so purgeable. The flake-like or needle-like crystals break down and they and the minute microscopic crystals fill up the voids between the normal grains, when the magma is subjected to centrifugal force in the centrifugal machine, so that the mother liquor cannot find its way out. A possible remedy is a prolonged washing operation. This is only partially effective at best if the magma contains any considerable amount of false grain and may involve moreover, a considerable loss in yield through dissolving of the sugar in the wash water.

By the phrase "one crystal type or the other", or equivalent language, I mean either the anhydrous or the hydrate type.

This application is a continuation in part of application 730,374, filed August 6, 1924, and is a division of application Serial No. 3,105, filed January 17, 1925. I do not claim herein, specifically, the method described under (b) of converting the starch at densities lower than now customary, as this method is claimed in my copending application Serial No. 407,286, filed November 14, 1929, as a continuation in part hereof.

As modifications will suggest themselves to those familiar with this art, I wish it to be understood that I propose to cover by patent all modifications and variations within the scope of the appended claims. Inasmuch as the practice, especially with respect to processes of conversion, will differ in different manufacturing establishments, some discretion as to details of the manner of carrying out the methods of my invention must of necessity be left to the operator.

I claim:

1. Improvement in the method of making anhydrous dextrose from a water dextrose solution which consists in crystallizing normal anhydrous dextrose crystals from a water dextrose solution containing 93% or higher of dextrose without the addition of seed.

2. Improvement in the method of making anhydrous dextrose from a water dextrose solution which consists in crystallizing normal anhydrous dextrose crystals from a water dextrose solution containing 93% or higher of dextrose without addition of seed and maintaining the crystallizing magma in movement so as to effect a uniform dispersion of the solid phase dextrose throughout the same.

3. Improvement in the method of making anhydrous dextrose from a water dextrose solution which consists in crystallizing normal anhydrous dextrose crystals from a water dextrose solution containing 93% or higher of dextrose without the addition of seed, and maintaining the crystallizing magma at a temperature favorable to the formation of the anhydride and in movement so as to effect a uniform dispersion of the solid phase dextrose throughout the same.

4. Improvement in the method of making anhydrous dextrose from a water dextrose solution, which consists in using for the process a solution having a purity of not substantially less than ninety-three per cent.

5. Improvement in the method of making anhydrous dextrose from a water dextrose solution, which consists in using for the process a solution having a purity of not substantially less than ninety-three per cent and maintaining the crystallizing magma at a temperature not substantially below 120° Fahrenheit.

6. Improvement in the method of making anhydrous dextrose from a water dextrose solution, which consists in using for the process a solution having a purity of not substantially less than ninety-three per cent, and maintaining the crystallizing magma in movement so as to effect a uniform dispersion of the solid phase dextrose throughout the same.

7. Improvement in the method of making anhydrous dextrose from a water dextrose solution, which consists in using for the process a solution having a purity of not substantially less than ninety-three per cent, and maintaining the crystallizing magma at a temperature not substantially below 120° Fahrenheit and in movement so as to effect a uniform dispersion of the solid phase dextrose throughout the same.

8. Improvement in the method of making anhydrous dextrose from a water dextrose solution which consists in using for the process a solution having a purity of not substantially less than 93 percent and a density of approximately 40° Baumé and bringing about supersaturation at a temperature favorable to crystallization of the anhydride while keeping the crystallizing magma in gentle agitation to effect uniform dispersion of the solid phase dextrose throughout such magma.

WILLIAM B. NEWKIRK.

CERTIFICATE OF CORRECTION.

Patent No. 1,783,626.  Granted December 2, 1930, to

WILLIAM B. NEWKIRK.

It is hereby certified that error appears in the printed specification of the above numbered patent requiring correction as follows: Page 3, line 29, strike out the word "range" first occurrence, and insert the same to follow "anhydrous" in line 28; and that the said Letters Patent should be read with this correction therein that the same may conform to the record of the case in the Patent Office.

Signed and sealed this 13th day of January, A. D. 1931.

(Seal)

M. J. Moore,
Acting Commissioner of Patents.